(12) United States Patent
Dahlquist (10) Patent No.: US 8,087,651 B2
(45) Date of Patent: Jan. 3, 2012

(54) COUPLING DEVICE

(75) Inventor: Hakan Dahlquist, Hässelby (SE)

(73) Assignee: System 3R International AB, Stockholm (SE)

( * ) Notice: Subject to any disclaimer, the term of this patent is extended or adjusted under 35 U.S.C. 154(b) by 0 days.

(21) Appl. No.: 11/388,834

(22) Filed: Mar. 23, 2006

(65) Prior Publication Data

US 2006/0220292 A1 Oct. 5, 2006

(30) Foreign Application Priority Data

Mar. 24, 2005 (EP) .................................... 05006466

(51) Int. Cl.
*B23Q 3/00* (2006.01)
(52) U.S. Cl. ...................................................... 269/309
(58) Field of Classification Search .................. 269/309, 269/310, 259 R, 902, 285, 296, 900; 279/41 R, 279/43.2; 250/440.11; 198/345; 33/180 R; 29/464
See application file for complete search history.

(56) References Cited

U.S. PATENT DOCUMENTS

| 4,164,076 A | * | 8/1979 | Carrigan | 33/644 |
| 4,838,533 A | * | 6/1989 | Buchler | 269/310 |
| 4,934,680 A | * | 6/1990 | Schneider | 269/309 |
| 5,065,991 A | * | 11/1991 | Schneider | 269/309 |
| 6,527,516 B2 | * | 3/2003 | Crevel | 416/204 R |

* cited by examiner

*Primary Examiner* — Hadi Shakeri
(74) *Attorney, Agent, or Firm* — Bachman & LaPointe, P.C.

(57) ABSTRACT

A coupling device having a first coupling part 3 provided with at least one projecting region, the regions of the first coupling part which project in the z direction being arranged eccentrically or centrally, and the projecting regions having conical outer surfaces formed with at least one angle relative to the z direction, the elastic regions 4 pointing in the direction of the center being formed in a radially parallel manner within the second coupling part 3. The the projecting regions of the first coupling part engage in the elastic regions 4 of the second coupling part 3 for the x-y orientation in the z direction. The second coupling part 3 is of one-piece design and can be produced in one operation.

7 Claims, 14 Drawing Sheets

COUPLING DEVICE

BACKGROUND OF THE INVENTION

The invention relates to a coupling device having a first coupling part provided with at least one projecting region and a second coupling part provided with at least one elastic region.

European Patent Application EP 0 255 042 discloses a clamping device for a tool on a machine tool, in particular for a die-sinking electrical-discharge machine. Described is a clamping device for a tool on a machine tool, in particular a die-sinking electrical-discharge machine, having a chuck which has two strips which project from the underside of the chuck and are provided with bearing surfaces for orienting the tool in an x direction and a y direction which point transversely to the centre line of the chuck. Provision is made for a plurality of posts to project from the underside of the chuck, said posts having reference surfaces, extending in the x-y plane, at their free end faces, the strips being formed eccentrically and at an angle relative to one another, and for a tool holder for bearing against the posts to have a plane surface in which two pairs of grooves are cut which are aligned with the strips and have elastic lips intended for bearing against the strips, the tool holder having a centre bore with locking elements for receiving a draw bolt in a locking and releasable manner.

The object of the present invention is to provide a coupling device which can be produced automatically and cost-effectively in one operation. Furthermore, the coupling device is to have optimum rigidity, loading capacity, force distribution and a low overall height.

SUMMARY OF THE INVENTION

The object is achieved according to the invention wherein the regions (2, 2') of the first coupling part (1, 1', 35, 42, 43, 44, 45, 46, 51) which project in the z direction are arranged eccentrically or centrally, and the projecting regions (2, 2') have conical outer surfaces formed with at least one angle (12, 12') relative to the z direction, in that the elastic regions (4) pointing in the direction of the centre are formed in a radially parallel manner within the second coupling part (3, 25, 26, 32, 33, 34, 41, 47, 49), the projecting regions (2, 2') of the first coupling part (1, 1', 35, 42, 43, 44, 45, 46, 51) engaging in the elastic regions (4) of the second coupling part (3, 25, 26, 32, 33, 34, 41, 47, 49) for the x-y orientation in the z direction, in that the second coupling part (3, 25, 26, 32, 33, 34, 41, 47, 49) is of one-piece design, and in that the workpiece (16) or the tool, the first coupling part (1, 1', 35, 42, 43, 44, 45, 46, 51) and the second coupling part (3, 25, 26, 32, 33, 34, 41, 47, 49) can be connected by means of a fastening device (53).

The second coupling part of the coupling device according to the invention proves to be capable of being produced in one operation. It can be produced in one step on a lathe or milling machine. The production costs of the coupling device according to the invention are thus considerably reduced compared with the production costs of the coupling devices of the prior art. The second coupling part has many uses, so that only a few embodiments are necessary. The storage costs are therefore reduced. The coupling device according to the invention permits high-load applications. The risk of fracture is minimized. The coupling device can be produced and also used in a simple manner with both off-centre and central reference features.

The second coupling part may be of square design with a circular or square opening.

Depending on the desired application, the outer circumference of the second coupling part is circular or rectangular, preferably square. Likewise, the inner region of the second coupling part may be circular or rectangular, preferably square.

According to a further embodiment, the first coupling part can have a conically shaped, projecting, centrally arranged region, and the elastic regions of the second coupling part can interact with the centrally projecting region of the first coupling part.

The elastic regions of the second coupling part are preferably designed as circular sector sections, as circular sector sections with tongues, or in a tongue shape. These circular and/or tongue-shaped elastic regions can be produced in a simple manner on a lathe or milling machine.

The coupling device according to the invention may be produced from conventional steel, the steel being hardened by a thermal ageing process.

Furthermore, coupling devices can be made of aluminium or plastic.

In a known manner, the coupling device according to the invention has a fastening device for fastening the second coupling part to the first coupling part. All fastening devices known in the prior art are conceivable, such as, for example, a bayonet fastener, screwing by means of a central screwed connection, etc.

According to a preferred embodiment, the elastic regions are profiled and may additionally have a recess in the radial direction opposed to the centre of the second coupling part. This feature results in higher strength and loading capacity in the clamped state.

In a corresponding manner, the elastic regions may have different thicknesses in the radial direction in order to increase the strength and the loading capacity of the coupling device.

The arrangement of a web at the elastic regions in the direction of the centre of the second coupling part can preferably increase the strength and loading capacity of the coupling device.

A further preferred embodiment of the coupling device consists in the fact that at least two second concentric coupling devices having different circumferential radii are arranged one inside the other. That is to say the coupling device can be used on two sizes. For example, the inner second coupling part may be provided with a central cone, and the outer second coupling part may be provided with four off-centre bars. Likewise, the inner second coupling part may have off-centre bars.

Apart from that, the coupling device according to the invention may be constructed the other way round, i.e. the first coupling part has the elastic regions which interact with the projecting regions on the second coupling part.

The coupling device according to the invention can be used in connection with pallets.

The advantages associated with the coupling device are achieved in particular by the elastic regions of the second coupling part being arranged within the annular body of the second coupling part and not above it as in the prior art.

BRIEF DESCRIPTION OF THE DRAWINGS

The invention is described below with reference to exemplary embodiments. In the drawings.

DETAILED DESCRIPTION

Figure 1:
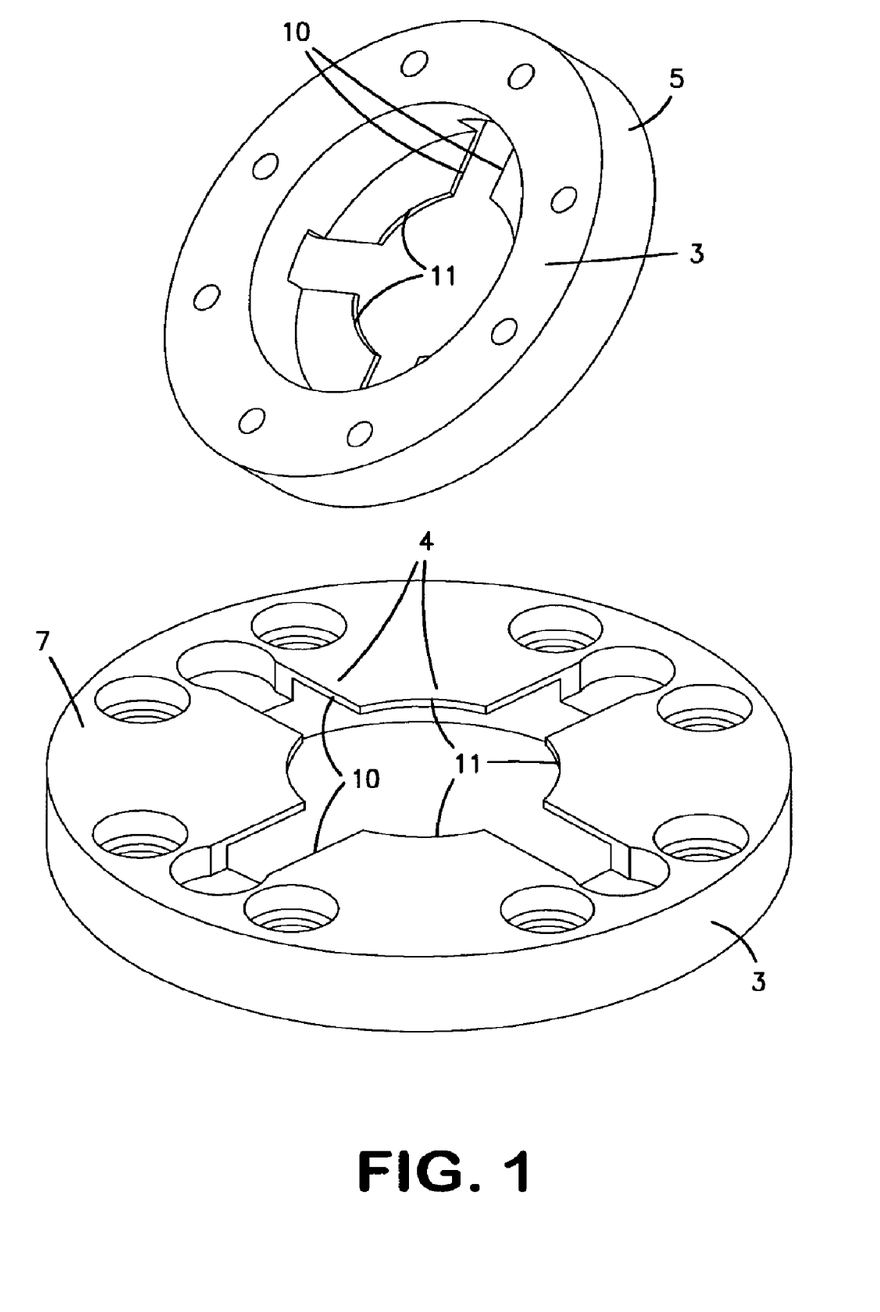
FIG. 1 shows a three-dimensional illustration of the second coupling part.

A three-dimensional view of the second coupling part 3 produced in one piece is shown from above and below in FIG. 1. In this exemplary embodiment, the second coupling part 3 is shown as a ring 5. A square embodiment is likewise conceivable. The second coupling part has elastic sector-shaped regions 4 which point inwards with respect to the annular region 5. The annular region 5 and the elastic regions 4 form a surface 7 having the elastic lateral 10 and circular 11 marginal regions.

Figure 2A:
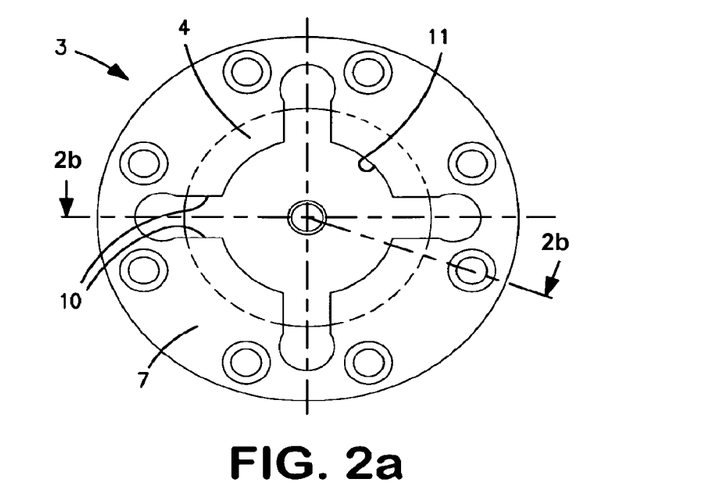
FIGS. 2a and b show the second coupling part in plan view and sectional view 2b-2b.
Figure 2B:
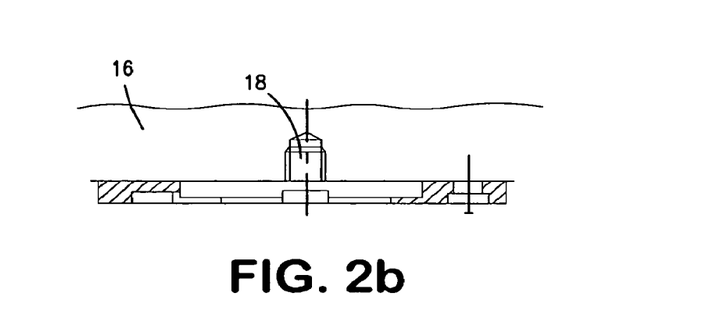

The second coupling part 3 is shown in plan view and sectional view 2b-2b in FIGS. 2a and 2b. It has elastic regions 4. The elastic regions 4 are four segments having lateral 10 and circular 11 marginal regions.

Figure 3A:
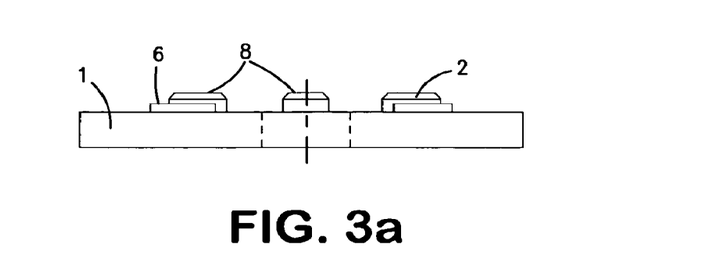
FIGS. 3 to 8 show various embodiments of the second coupling part, FIGS. 9a and b show a two-piece embodiment of the second coupling part.
Figure 3B:
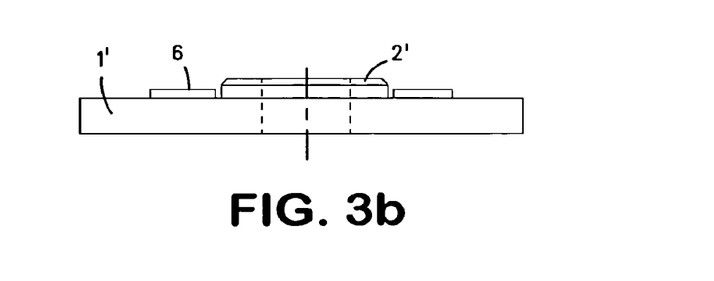

Two embodiments of the first coupling part 1 and 1' are shown in section in FIGS. 3a and 3b. FIG. 3a has bars as projecting regions 2, and FIG. 3b has a central cone as projecting region 2'.

The first coupling part 1 can be connected together with the second coupling part, for example, to the workpiece 16, tool 16, etc., by means of a fastening device (not shown). All known fastening devices are conceivable, for example by means of bayonet fastener, restraining by means of balls, etc. Shown in FIG. 2b a tapped hole 18 is provided, into which a screw (not shown) can be screwed for restraining the second coupling part together with the first coupling part.

In the clamped state, the elastic lateral marginal regions 10 interact with the projecting bars 2 of the first coupling part 1 with respect to the x-y orientation. In the clamped state, the centrally arranged cone provided in the first coupling part 1' touches the elastic circular marginal regions 11 in an orienting manner in the x-y plane.

The z orientation is effected via the seating surfaces 6, which touch the surface 7 in the clamped state.

Figure 4A:
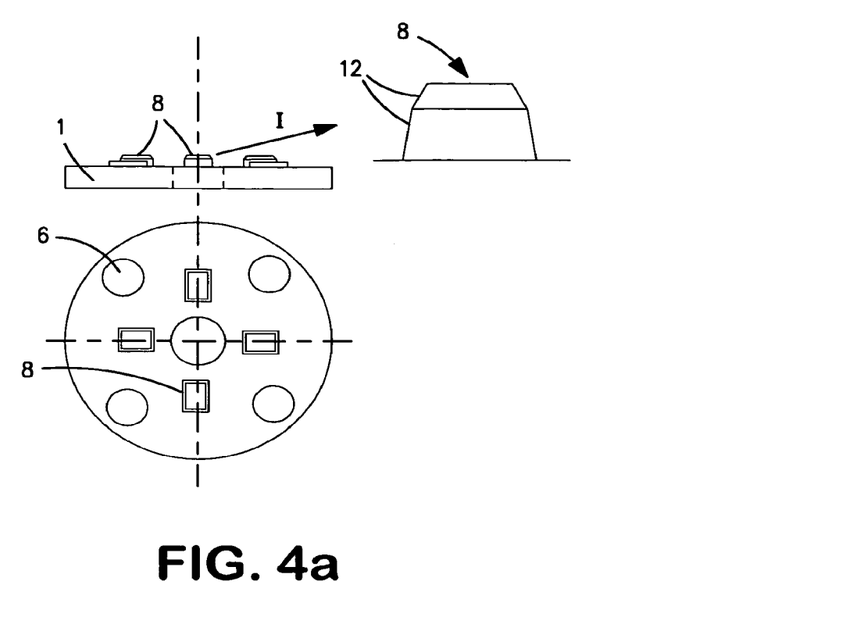
Figure 4B:
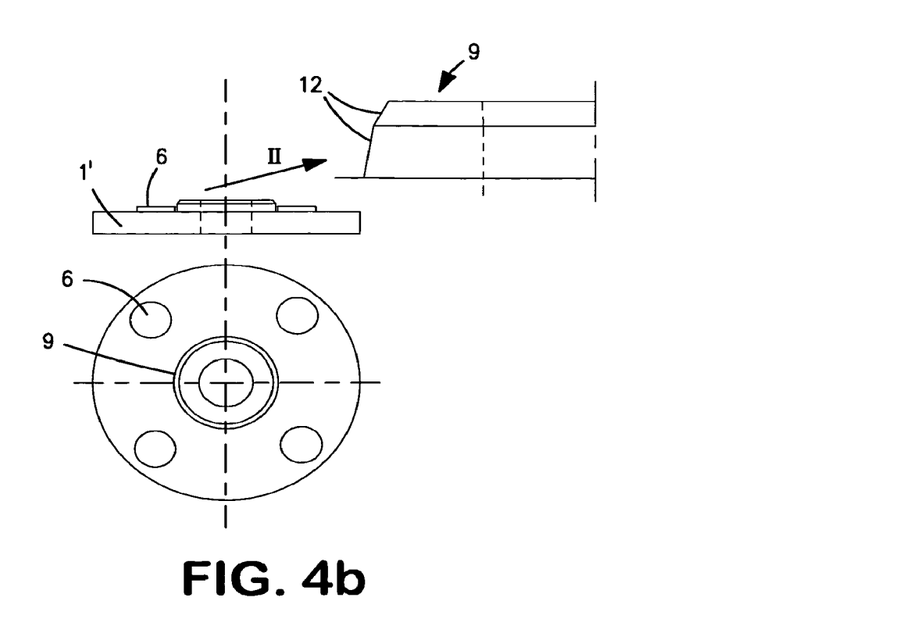

The first coupling part is shown once again in plan view and sectional view in two exemplary embodiments 1 and 1' in FIGS. 4a and 4b. The first coupling part 1 with the bars 8 can be seen in FIG. 4a. A first coupling part 1' with a central cone 9 is shown in FIG. 4b. Both first coupling parts 1, 1' have seatings 6 for the z orientation. The surfaces of the bars 8 and of the cone 9 having two bevels with different angles 12 of slope can be seen in the enlarged individual illustrations I and II.

Figure 5A:
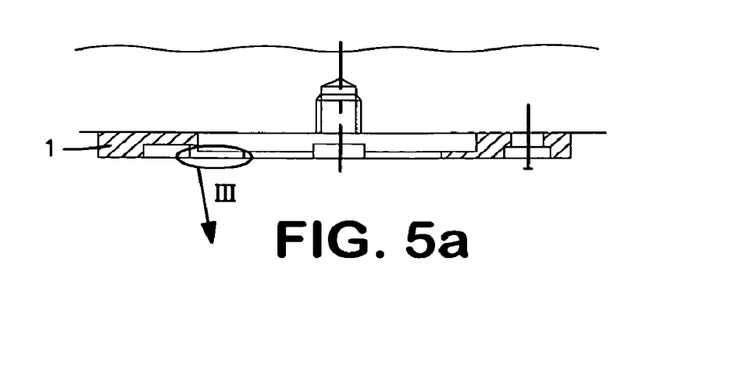
Figure 5B:
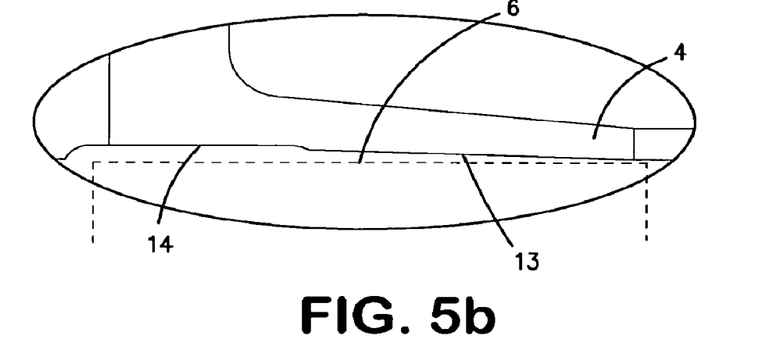
Figure 5C:
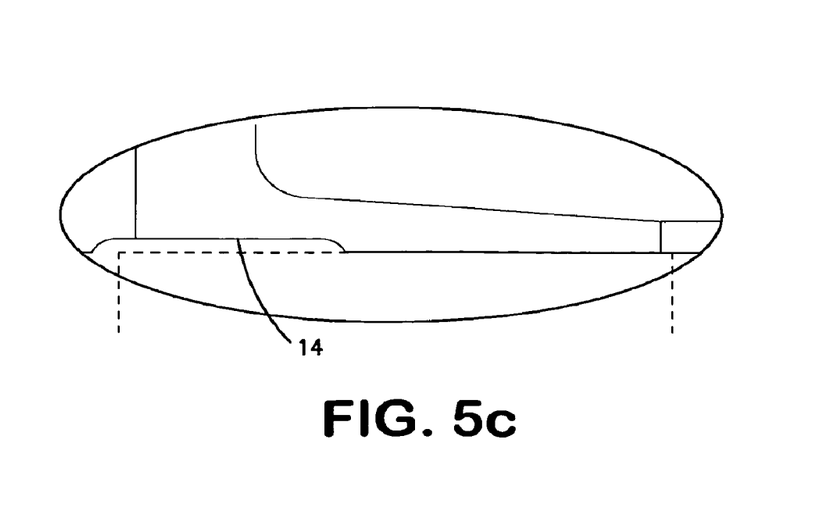

Another embodiment of the first coupling part 1 or 1' shows the elastic region 4 with a profile. The profile has an inclination 13 and a recess 14, as can be seen in FIGS. 5b and c. FIGS. 5b and c represent enlargements of the detail III in FIG. 5a, FIG. 5b showing the coupling device in the relaxed state and FIG. 5c showing it in the clamped state. The broken line is intended to represent a bar 8 or a seating surface 6. Before the coupling device is clamped, the inclined profile is in contact in a first step, the elastic element 4 orients the first coupling part 1, and the inclination 13 is oriented parallel to the bar surface or to the seating surface. A recess 14 is preferably incorporated in the elastic region 4. The recess 14 is provided above the contact surface. The advantage associated therewith means high rigidity, better loading and greater resistance to fracture. At higher loads, the elastic contact between the elastic regions 4 and the bar surfaces changes to firm contact with the recesses 14. Further bending of the elastic regions is thus prevented. Fracture is prevented as a result.

Figure 6A:
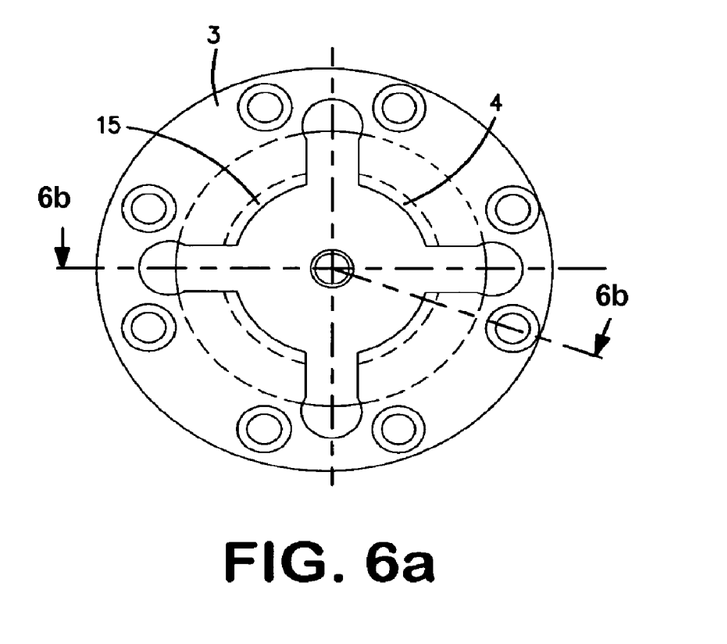
Figure 6B:
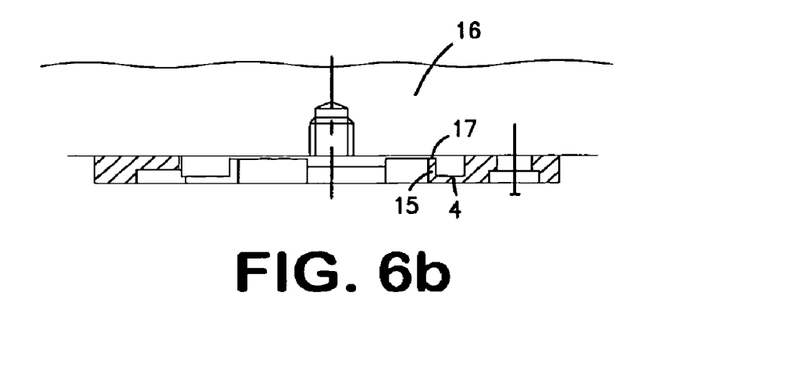

FIGS. 6a and b show a further embodiment of the first coupling part. The elastic regions 4 additionally have a web 15 at the region pointing towards the centre. The web 15 increases the rigidity. The web 15 forms a narrow gap 17 at the end pointing in the direction of the workpiece 16. This preferred embodiment can be used in particular for coupling devices made of materials different from steel, such as, for example, aluminium, plastic, etc.

Figure 7A:
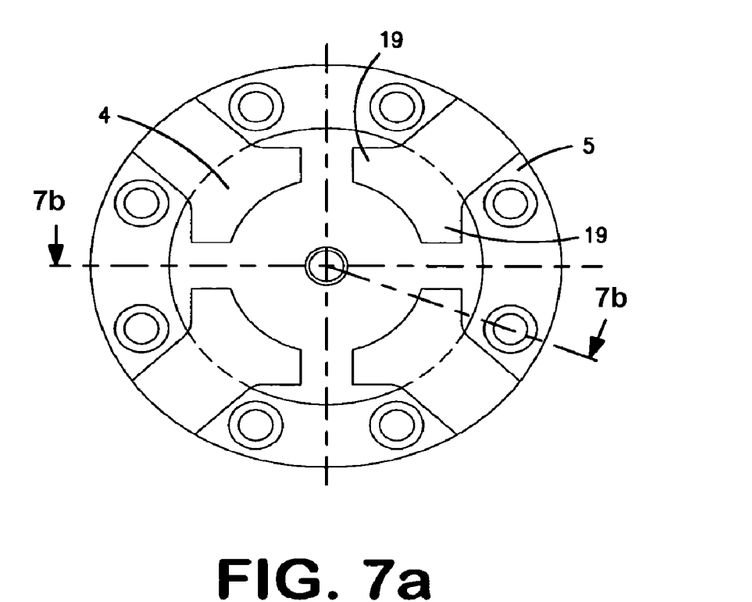
Figure 7B:
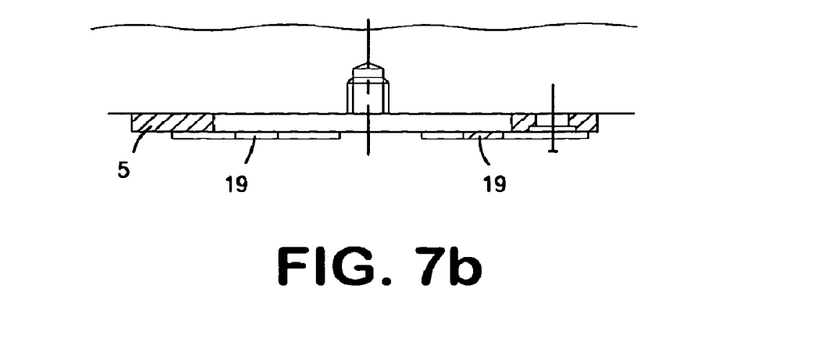

Another embodiment of the elastic regions 4 can be seen in FIGS. 7a and 7b, FIG. 7b showing a sectional illustration of FIG. 7a in direction 7b-7b. The elastic regions 4 have tongue-shaped regions 19. The advantage associated therewith consists in particular in an increase in the elasticity. Each tongue 19 can be deformed more effectively on its own.

Figure 8A:
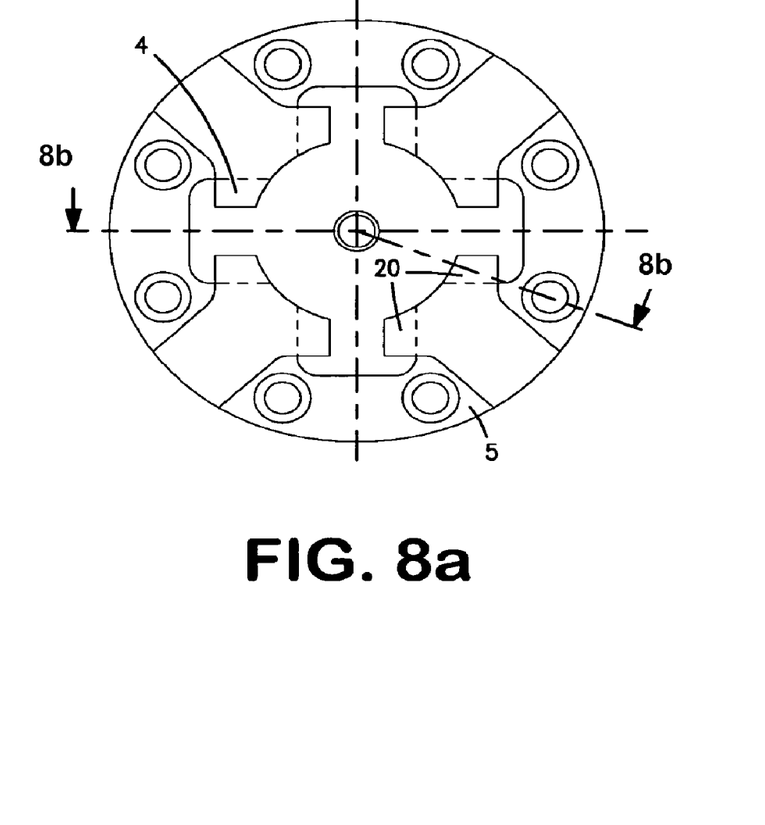
Figure 8B:
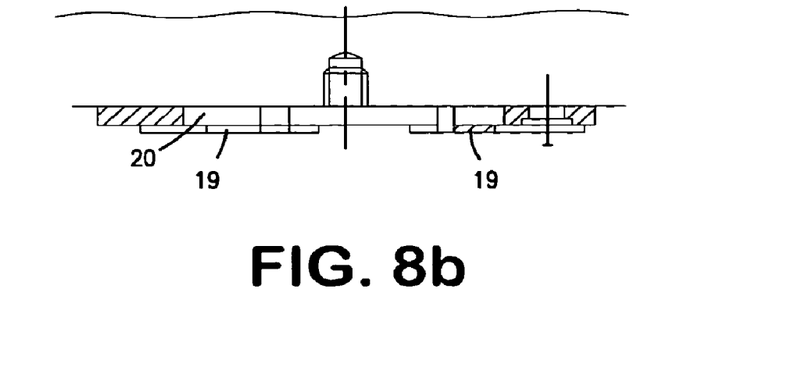

FIGS. 8a and 8b show a further configuration of the elastic regions. FIG. 8b shows the section along line 8b-8b. In contrast to the embodiment in FIGS. 7a and 7b, the annular part 5 has projections 20 below the elastic regions, and these projections 20 support the elastic regions, so that only the projecting tongue-shaped regions can be elastically deformed during the clamping, which results in greater accuracy.

Figure 8C:
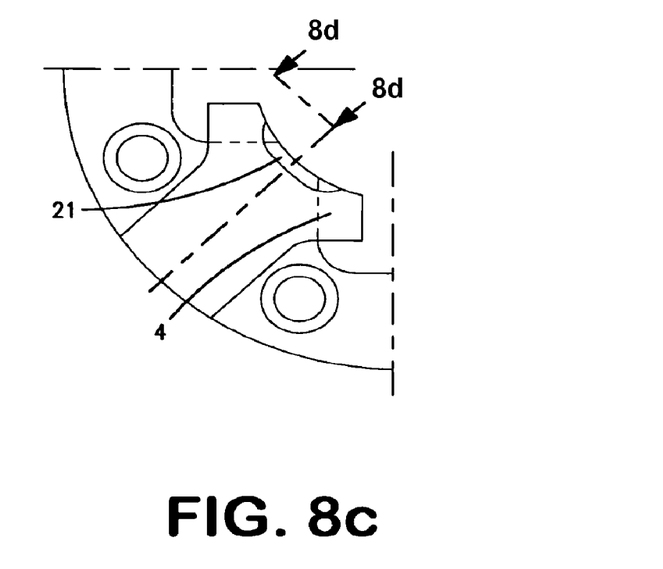
Figure 8D:
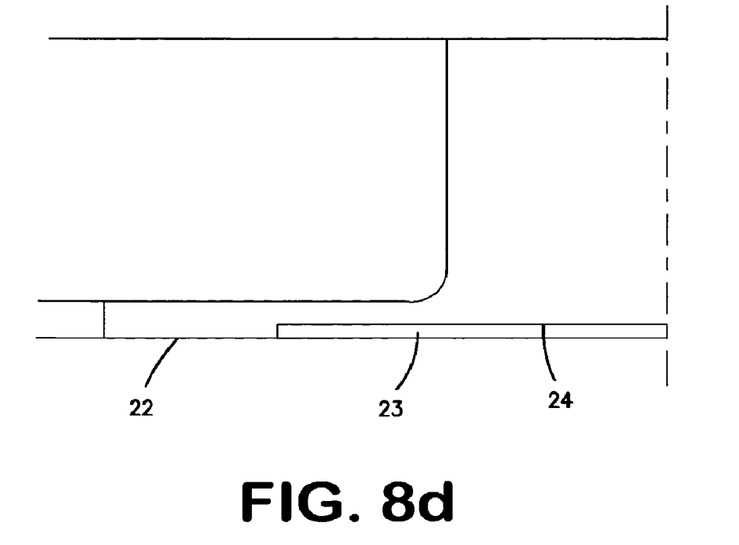

In FIGS. 8c and 8d (section in direction 8d-8d), the circular margin of the elastic regions 4 has a cutout 21, i.e. the region between the tongues 19 is fixed. The result is in an elastic restraint in the contact region 22 during average loads with high accuracy. There is thus no firm contact in the region of the recess 23. At an even higher load, the tongues 19 are bent further in the axial direction until firm contact with the surface 24 is obtained, whereby higher strength and resistance to fracture is obtained.

Figure 9A:
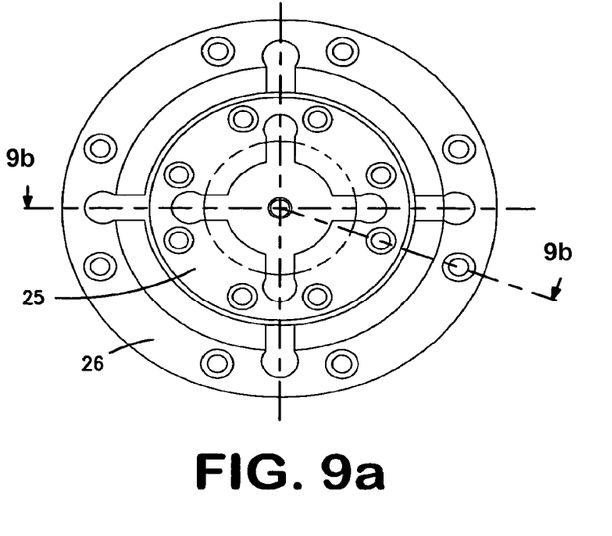
Figure 9B:
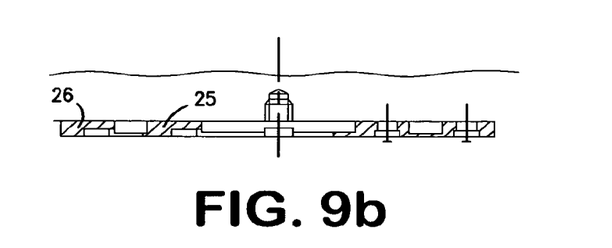
Figure 10A:
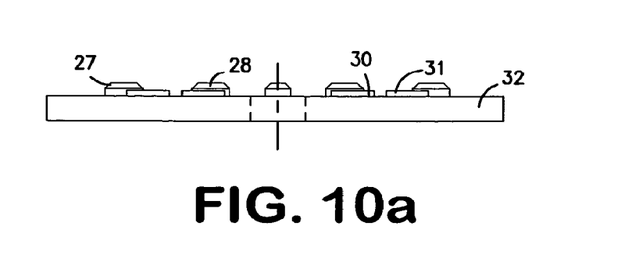
FIGS. 10a and 10b show the first coupling part matching FIG. 9, FIGS. 11a and b show sectional illustrations of the first coupling part of FIG. 10, FIGS. 12a, b and c show a coupling device of low overall height, FIGS. 13a and b show a second coupling part with bars and cone.
Figure 10B:
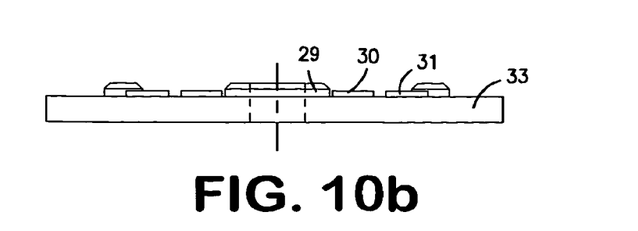
Figure 11A:
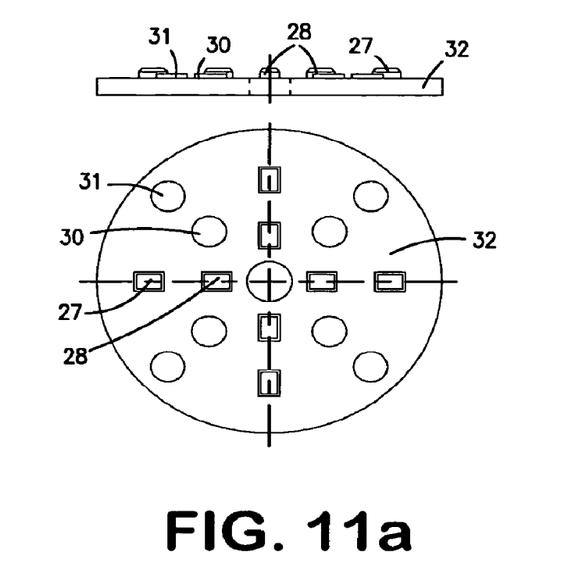
Figure 11B:
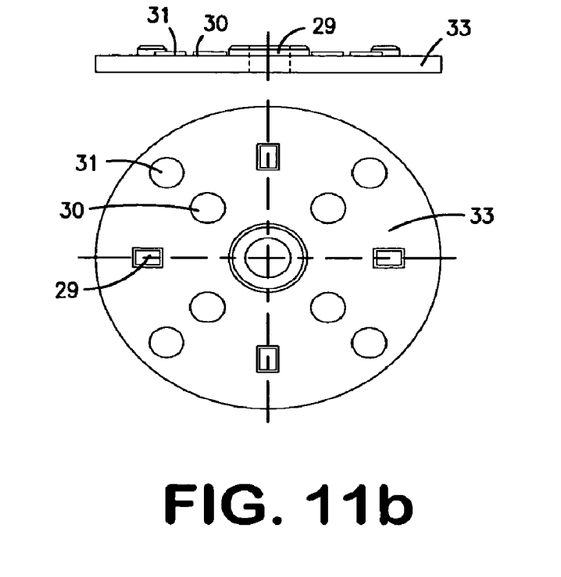

FIGS. 9 to 11 show a coupling device having a two-piece second coupling part 25 and 26 and the associated first coupling part 32 and 33. The second coupling part in FIG. 9a and in the sectional illustration according to FIG. 9b can consist of at least two second coupling parts 25 and 26, the inner coupling part 25 being arranged concentrically in the outer coupling part 26. Due to the two-piece configuration, various embodiments described above can be combined, depending on the existing boundary conditions. That is to say coupling devices are possible in which the elastic regions 4 with respect to the inner coupling part 25 may differ from the elastic regions 4 of the outer coupling part 26.

The coupling devices having the two second coupling parts 25 and 26 and the associated first coupling parts 32 and 33 are shown in FIGS. 9 to 11. They are of similar construction to the one-piece first coupling parts in the previous figures. Reference numerals 27 signify the outer bars, 28 the inner bars, 29 the central cone, 30 the inner z seatings and 31 the outer z seatings.

Figure 12A:
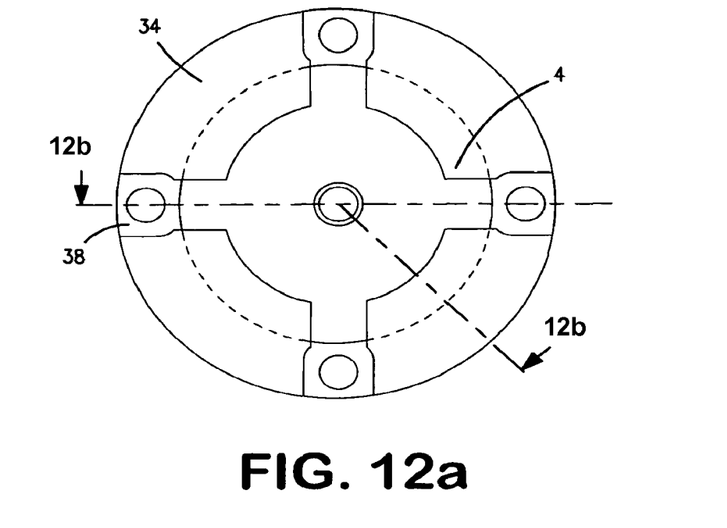
Figure 12B:
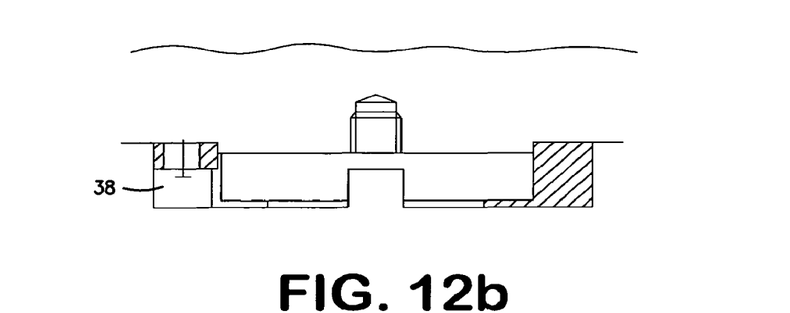
Figure 12C:
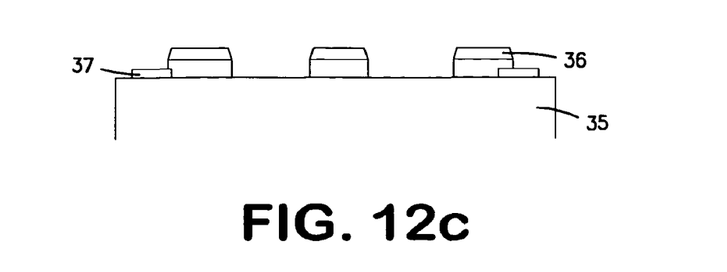

A coupling device of smaller diameter is shown in FIGS. 12a to 12c. The second coupling part 34 in FIG. 12a and in the sectional drawing 12b-12b in FIG. 12b has recesses 38 between the elastic regions 4. The recesses 38 provide space for the z seatings 37 of the first coupling part 35 in FIG. 12c.

Figure 13A:
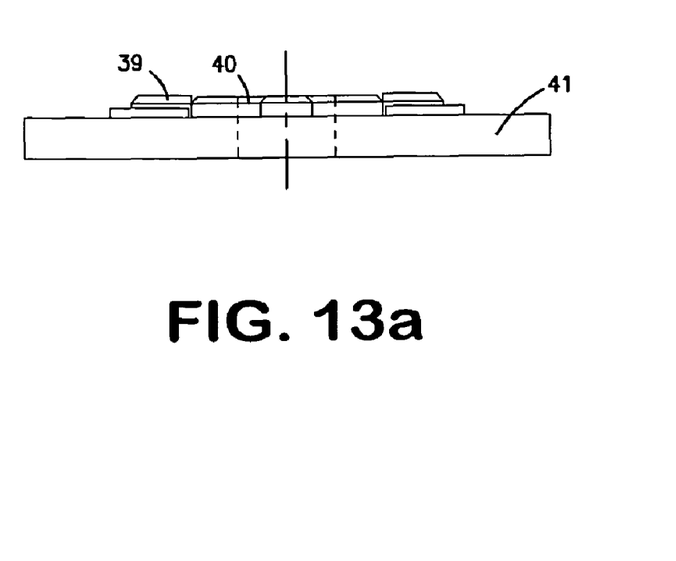
Figure 13B:
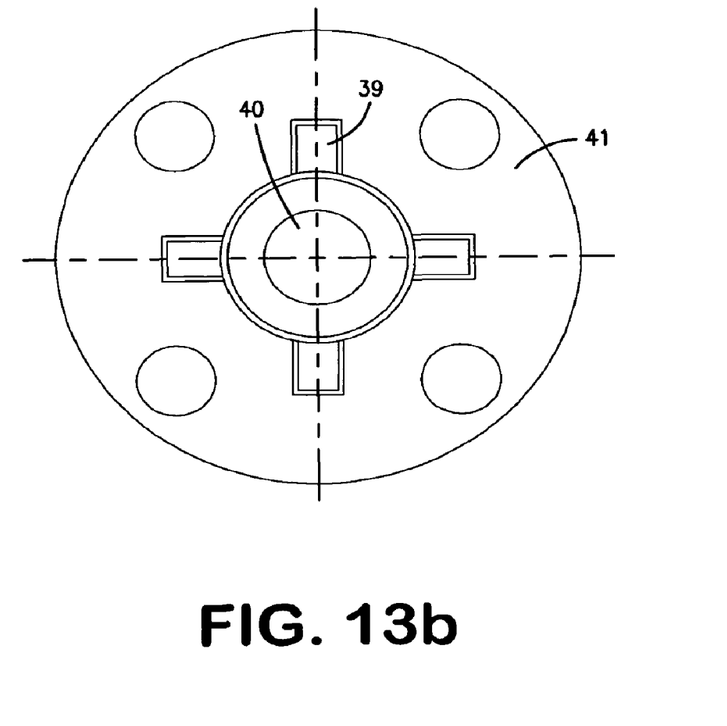

A combination of bars 39 and central cone 40 is shown in the second coupling part 41 in FIGS. 13a and 13b. This combination can be used in the case of pallets with individual holders or multi-holders. The combination shown in FIGS. 13*a* and *b* can then be used advantageously in a space-saving manner.

Figure 14A:
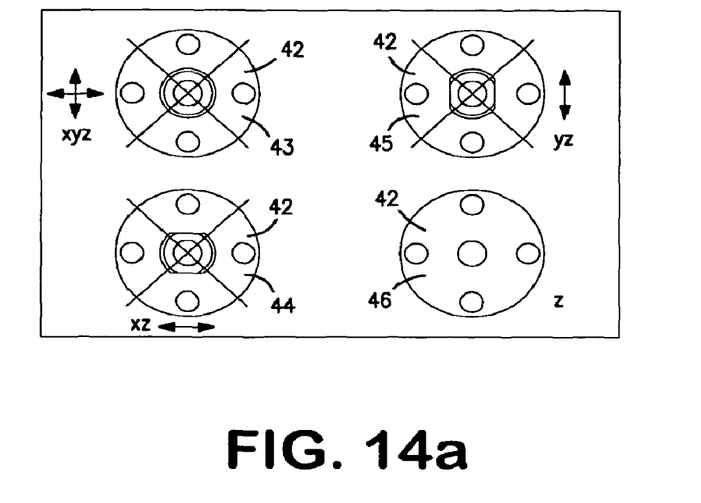
FIGS. 14 to 15 show applications of the coupling device in pallets.
Figure 14B:
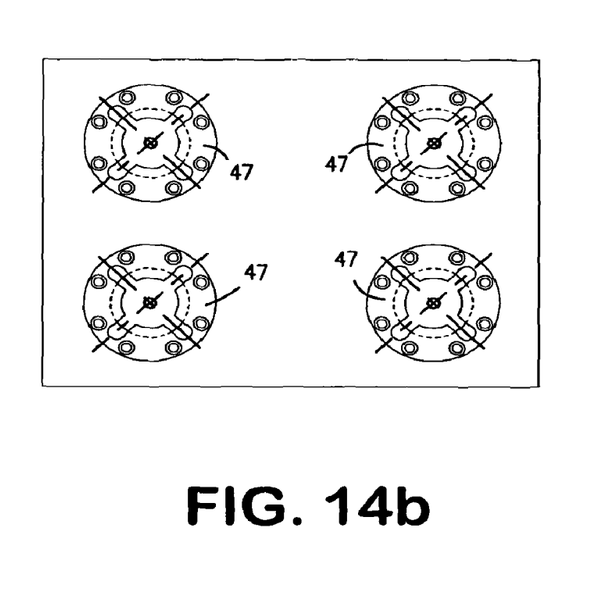

An application for pallets is shown in FIGS. 14*a* and *b*. Four first coupling parts 42 can be seen, the first coupling part 43 in FIG. 14*a* being provided for x-y-z orientation, the first coupling part 44 being provided for x-z orientation, the first coupling part 45 being provided for y-z orientation and the first coupling part 46 being provided for z orientation. For all applications, the second coupling part 47 is disclosed in a single embodiment in FIG. 14*b*.

Figure 15A:
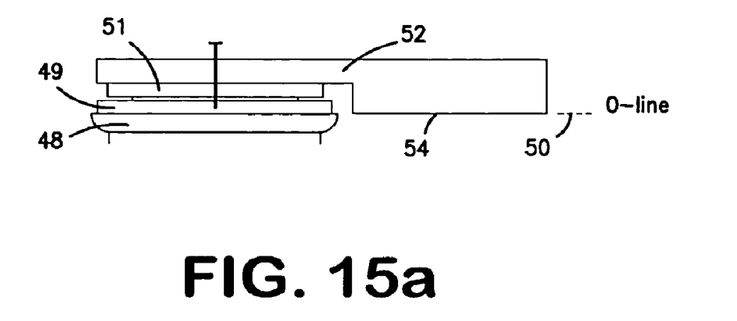
Figure 15B:
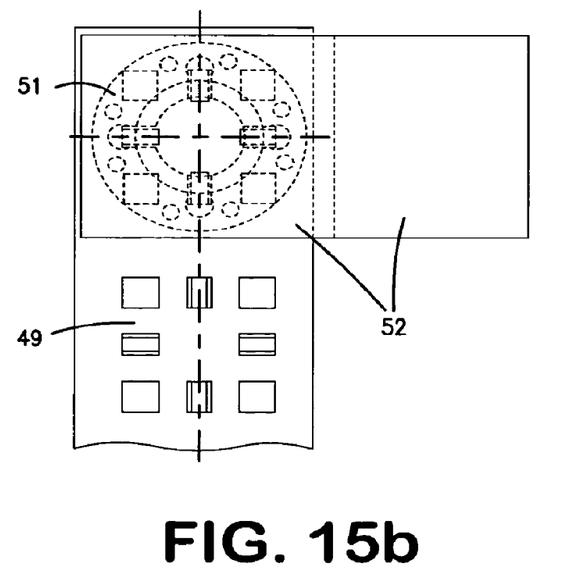

FIGS. 15*a* and *b* show a further application of the coupling device. Here, in particular the low overall height of the coupling device is to be emphasized, which is required in wire electrical-discharge machines for example. The first coupling part 49 is fastened to the base 48 of the wire electrical-discharge machine. The second coupling part 51 is connected to the workpiece 52, the bottom surface 54 of the workpiece 52 lying with the base surface 54 of the wire electrical-discharge machine at the level of the 0 line 50.

Of course, the first coupling part and the second coupling part can be used the other way round for all the embodiments described above, i.e. the first coupling part has elastic regions and the second coupling part has projecting regions.

The invention claimed is:

1. Coupling device for coupling tools in a tool machine comprising a first circular shaped coupling part provided with at least one projecting region and a second circular shaped coupling part provided with a plurality of spaced apart elastic regions, wherein the at least one projecting region of the first coupling part which projects in a z direction is arranged either centrally or eccentrically, and the at least one projecting region has a conical outer surface (2, 2') formed with at least one angle relative to the z direction, wherein the at least one projecting region of the first coupling part engages in the elastic regions of the second coupling part for an x-y orientation in the z direction, wherein the second coupling part is of one-piece design, and wherein the second coupling part is of annular design with a circular inner opening, wherein the elastic regions of the second coupling part are formed in a radial manner and point radially into the inner opening, and wherein the elastic regions are of undercut tongue-shaped design in the form of circular sector sections each comprising a pair of elastic lateral regions defining a circular marginal region, the elastic regions are free to move in the z direction relative to the coupling part, wherein the coupling device is configured for optimum rigidity, loading capacity, force distribution and a low overall height and wherein the elastic regions in the direction of the centre of the second coupling part increase the strength and loading capacity of the coupling device, and further wherein said angle of said at least one projecting region angles inwardly towards a longitudinal axis of the at least one projecting region such that the at least one projecting region and the elastic regions do not lock and are free to move in the z direction when engaged.

2. Coupling device according to claim 1, wherein the first coupling part has a conical shaped, projecting, centrally arranged region (9), wherein the elastic regions of the second coupling part interact with the centrally projecting region of the first coupling part.

3. Coupling device according to claim 1, wherein the coupling parts are produced from a hardened steel.

4. Coupling device according to claim 1, wherein the coupling parts are produced from aluminum.

5. Coupling device according to claim 1, wherein the coupling parts are produced from plastic.

6. Coupling device according to claim 1, wherein a fastening device for fastening the second coupling part to the first coupling part comprises a bayonet fastener.

7. Coupling device according to claim 1, wherein the first coupling part has a plurality of conical shaped, projecting, eccentrically arranged regions (8), wherein the elastic regions of the second coupling part interact with the eccentrically projecting regions of the first coupling part.

* * * * *